May 15, 1951 L. V. BLAKE 2,552,512

KEYING CIRCUIT

Filed May 23, 1942

Inventor

Lamont V. Blake

By

Attorney

Patented May 15, 1951

2,552,512

UNITED STATES PATENT OFFICE 2,552,512

KEYING CIRCUIT

Lamont V. Blake, Washington, D. C.

Application May 23, 1942, Serial No. 444,265

10 Claims. (Cl. 250—36)

(Granted under the act of March 3, 1883, as amended April 30, 1928; 370 O. G. 757)

This invention relates to a system of keying an ultra high frequency oscillation generator for use in echo range finding systems.

It is an object of this invention to cause high power oscillations to occur in a sequence of pulses of very short time duration, each pulse separated from the other by a relatively large interval of time during which no oscillation occurs.

It is another object of this invention to provide a system for keying an oscillator independently of the grid current.

It is another object of this invention to provide a system for keying an oscillator by controlling the grid voltage.

It is still another and more specific object of this invention to increase the efficiency at which a pulse oscillator will operate.

Referring now to the drawings.

Numerous schemes for generating oscillation in a sequence of pulses have been devised, most of which are inapplicable for radio echo range finding work. When utilizing the common "self-quench" pulse generator comprising an oscillator, a sine wave keying voltage and a parallel cathode resistance $R_K$, capacitance $C_K$ quench network, there are encountered two important difficulties, i. e. the possibility of haphazard pulsing and the inefficiency at which the oscillator works.

If a sine wave voltage be applied to the grid of the oscillator, oscillation will start at a point near the positive peak of the voltage cycle and will be sustained until the cathode current charges $C_K$ to a voltage exceeding the "cut-off" bias by a sufficient amount to "quench" oscillation. The charge on $C_K$ is then permitted to leak off through $R_K$ and the oscillation cycle is ready to be repeated. The sequence at which oscillation occurs is usually dependent upon the frequency of the sine wave keying voltage but often will occur haphazardly due to an incorrect selection of constants in the "quench" circuit, or a gradual rise of the synchronizing voltage. Each pulse will be separated by a comparatively long interval of time during which no oscillation will occur.

Moreover, when a sine wave keying voltage is employed to synchronize the action of a self-quenching oscillator of the foregoing character the gradual rise of the sine wave synchronizing voltage will cause "idle" plate current to flow for a finite period of time preceding the start of oscillation. This "idle" plate current will produce a voltage across $C_K$ of a polarity which will subtract from the grid cathode voltage, thus prolonging the period of "idle" plate current preceding the starting point of oscillation, resulting in a very poor over-all oscillator efficiency.

It is therefore obvious that a synchronizing voltage of a more abrupt wave front (steeper rise of voltage immediately preceding oscillation) is desirable, as it will limit the amount of time of "idle" plate current flowing in the cathode quenching circuit.

Figure 1:
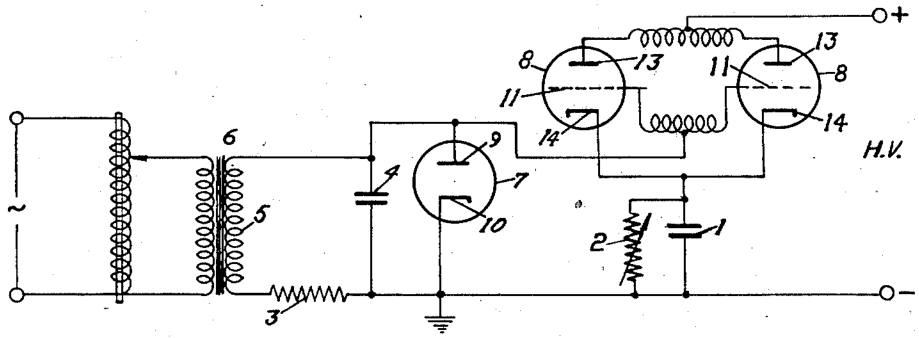
Fig. 1 is a schematic diagram of a circuit embodying the principles of this invention.

The "self-quench" pulse generator of Fig. 1 utilizing the preferred synchronizing wave form produced by this invention. Capacitance 1 and variable resistances 2 connected in the cathode circuit of the oscillator to form the quenching network are selected so to have a natural period approximately equal to the frequency of the synchronizing voltage applied to transformer 6. This is essentially for the purpose of producing one and only one pulse per cycle of synchronizing voltage and thus insuring stability and accuracy in pulsing.

The secondary winding 5 of the adjustable voltage transformer 6 is protected by resistance 3 and capacitance 4 from a high grid current surge.

Figure 2:
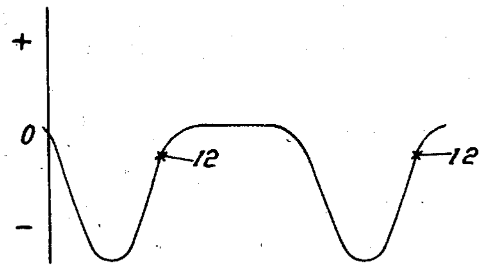
Fig. 2 is a diagram of the steep wave front keying voltage provided by this invention.

The synchronizing voltage introduced into the circuit through transformer 6 is rectified by diode rectifier 7 connected across the grid-cathode circuit of oscillator 8. When the synchronizing voltage drives the plate 9 of the diode 7 positive with respect to its cathode 10 the diode 7 will conduct and short circuit the grid-cathode circuit of the oscillator 8. On the next half cycle the diode plate 9 will be driven negative with respect to its cathode 10 thus becoming inoperative and supplying the grid 11 with a keying voltage similar to that shown in Fig. 2. The steep wave front keying voltage is produced by the rectifying action of diode 7. It has been discovered that the pulse will start just before the keying voltage reaches the most positive part of its cycle as indicated by reference numeral 12. The duration of the pulse depends mainly upon the value of capacitance 1 and the amount of oscillator plate current.

Figure 3:
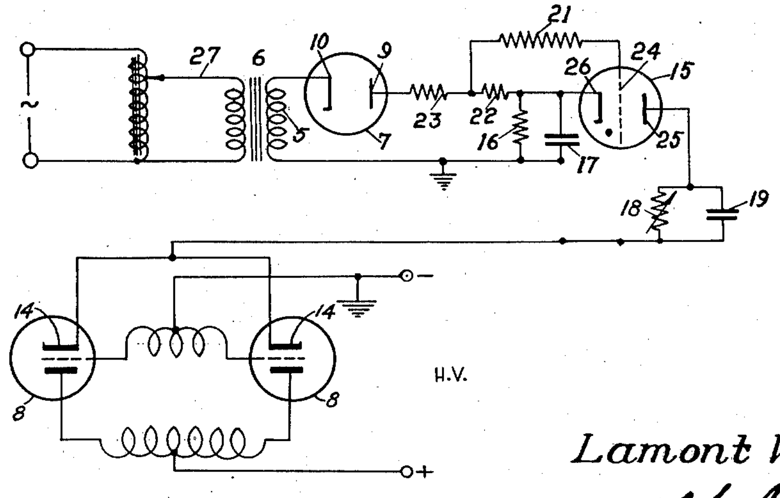
Fig. 3 is a schematic diagram of a modified embodiment of this invention.

In some cases the control grid 11 of the oscillator has to be actually driven positive before oscillation will occur. Such is the case in the arrangement shown in Fig. 3. In this embodiment, a grid glow tube 15 inserted in the cathode circuit of the oscillator 8 acts essentially as an automatic switch for the cathode 14. Resistance 18 and capacitance 19 connected between the cathode 14 of the oscillator and the plate of the switch tube 15 are selected so as to have a natural period approximately equal to the frequency of the synchronizing voltage. Resistance 16 and capacitance 17 connected in the cathode circuit of switch tube 15 are chosen in accordance with resistance 18 and capacitance 19 and play a vital part in determining the pulse duration and sequence.

When the synchronizing voltage from the secondary winding 5 of transformer 6 swings the cathode 10 of diode 7 negative, plate current will flow, charging condenser 17 and also producing a voltage drop across resistance 22 during conduction of diode 7. The voltage drop across resistance 22 will bias grid glow tube 15 negative by an amount sufficient to prevent it from conducting. Condenser 17 does not take any more charge after the synchronizing voltage has reached the maximum part of its negative cycle at point 27. The charging current flowing through resistance 22 ceases, and grid 24 loses its bias thus permitting grid glow tube 15 to conduct. At this instant the voltage existing across condenser 17 is suddenly applied to the cathode 14 of the oscillator 8 driving it sharply negative. Consequently oscillator 8 will conduct and start to oscillate. During the period of oscillation a plate current will flow in the oscillator 8 producing a voltage across condenser 19 of sufficient magnitude to quench oscillation. The voltage developed across condenser 19 due to the oscillator cathode current is of polarity which opposes the voltage on condenser 17 thus detracting from the plate voltage of the grid glow tube 15, causing it to stop conducting. Due to the comparatively short time required for the oscillation pulse to occur and the time required for the fall of synchronizing voltage, the potential across condenser 17 has fallen to a value less negative than point 27. Charging current will start to flow again biasing grid glow tube 15 negative. The time constant of condenser 17 and resistances 22, 23 must be large enough to prevent condenser 17 from charging to an appreciable amount until the next negative cycle of the synchronizing voltage is impressed on the cathode of the diode 7. The bleeder resistor 16 will assist in this respect.

Pulses having a peak power of 50 kilowatts and a five microsecond duration have been obtained in a typical arrangement.

Though I have shown and described certain and specific embodiments of this invention I am fully aware of the many possible modifications thereof. This invention is only to be restricted insofar as is necessitated by the prior art and by the spirit of the appended claims.

The invention described herein may be manufactured and used by or for the Government of the United States of America for governmental purposes without the payment of any royalties thereon or therefor.

I claim:

1. Means for generating high power ultra-high frequency oscillation in a sequence of pulses, each of said pulses being of very short duration and separated one from the other by relatively long intervals of time during which no oscillation occurs, comprising a self-quenching oscillator tube, having grid, anode, and cathode electrodes, a source of alternating synchronizing voltage, and means including a half wave rectifier coupling said alternating voltage to the grid cathode circuit of said oscillator, said half wave rectifying means being poled to apply a negative pulsating voltage to the grid circuit of said oscillator.

2. Means for generating high power ultra-high frequency oscillation in a sequence of pulses, each of said pulses being of very short duration and separated one from the other by relatively long intervals of time during which no oscillation occurs, comprising a self-quenching oscillator tube, having grid, anode and cathode electrodes, a resistance-capacitance oscillation quench circuit connected in the cathode circuit of said oscillator, a soure of alternating synchronizing voltage, and means including a half wave rectifying element coupling said synchronizing voltage to the grid cathode circuit of said oscillator, said half wave rectifying element being poled to apply a negative pulsating voltage to the grid circuit of said oscillator.

3. Means for generating high power ultra-high frequency oscillation in a sequence of pulses, each of said pulses being of very short time duration and separated one from the other by relatively long intervals of time during which no oscillation occurs, comprising a self-quenching oscillator tube, having grid, cathode and anode electrodes, a parallel resistance-capacitance oscillation quench circuit forming a predetermined time constant connected in the cathode circuit of said oscillator tube, a source of alternating synchronizing voltage having a period substantially equal to the time constant of the quench circuit, and means including a half wave rectifying element coupling said synchronizing voltage to the grid cathode circuit of said oscillator, said half wave rectifying element being poled to apply a negative pulsating voltage to the grid circuit of said oscillator.

4. Means for generating high power ultra-high frequency oscillation in a sequence of pulses, each of said pulses being of short duration and separated one from the other by relatively long intervals of time during which no oscillation occurs, comprising an oscillator tube having a grid, an anode and a cathode, a grid glow tube having a grid, an anode and a cathode, a source of pulsating synchronizing voltage applied to the grid of said glow tube to control the conductivity thereof, and an oscillation quench circuit connecting the cathode of said oscillator to the anode of said glow tube.

5. Means for generating high power ultra-high frequency oscillation in a sequence of pulses, each of said pulses being of short duration and separated one from the other by relatively long intervals of time during which no oscillation occurs, comprising an oscillator tube having a grid, an anode and a cathode, a grid glow tube having a grid, an anode and a cathode, a source of pulsating synchronizing voltage applied to the grid of said glow tube to control the conductivity thereof, and an oscillation quench circuit comprising a parallel branch of resistance and capacitance connecting the cathode of said oscillator to the anode of said glow tube.

6. Means for generating high power ultra-high frequency oscillation in a sequence of pulses, each of said pulses being of short duration and separated one from the other by relatively long intervals of time during which no oscillation occurs, comprising an oscillator tube and a grid glow tube each having at least a grid, an anode, and a cathode, an oscillation quench circuit connecting the anode of said grid glow tube to the cathode of said oscillator, a source of synchronizing voltage, means including a half-wave rectifier connecting the grid cathode circuit of said grid glow tube to said source of synchronizing voltage to control the conductivity of said glow tube and thus the operation of said oscillator according to said synchronizing voltage.

7. Means for generating high power ultra-high frequency oscillation in a sequence of pulses, each of said pulses being of short duration and separated one from the other by relatively long intervals of time during which no oscillation occurs, comprising an oscillator tube and a grid glow tube each having at least a grid, an anode, and a cathode, an oscillation quench circuit connecting the anode of said glow tube to the cathode of said oscillator, said quench circuit comprising a parallel branch of resistance and capacitance, a source of synchronizing voltage, means including a half-wave rectifier connecting the grid cathode circuit of said glow tube to said source of synchronizing voltage to control the conductivity of said glow tube and thus the operation of said oscillator according to said synchronizing voltage.

8. Means for generating high power ultra-high frequency oscillation in a sequence of pulses, each of said pulses being of short duration and separated one from the other by relatively long intervals of time during which no oscillation occurs, comprising an oscillator tube and a grid glow tube each having at least a grid, an anode and a cathode, a source of synchronizing voltage, a half-wave rectifier connected to said synchronizing voltage, a pair of resistances connected in series between the anode of said rectifier and the cathode of said glow tube, means connecting the grid of said grid glow tube to the intermediate point of said two resistances, an oscillation quench circuit connecting the anode of said grid glow tube to the cathode of said oscillator.

9. Means for generating high power ultra-high frequency oscillation in a sequence of pulses, each of said pulses being of short duration and separated one from the other by relatively long intervals of time during which no oscillation occurs, comprising an oscillator tube and a grid glow tube each having a grid, an anode and a cathode, an alternating source of synchronizing voltage, a half-wave rectifier connected to said synchronizing voltage, a pair of resistance connected in series between the anode of said rectifier and the cathode of said grid glow tube, means connecting the grid of said grid glow tube to intermediate point of said two resistances, an oscillation quench circuit comprising a parallel branch of resistance and capacitance connecting the anode of said grid glow tube to the cathode of said oscillator.

10. Means for generating high power ultra-high frequency oscillation in a sequence of pulses, each of said pulses being of short duration and separated one from the other by relatively long intervals of time during which no oscillation occurs, comprising an oscillator tube and a grid glow tube each of which has a grid, an anode and a cathode, a source of synchronizing voltage, a half-wave rectifier having a cathode and an anode, the cathode of which is connected to said synchronizing voltage, a pair of resistances connected in series between the anode of said rectifier and the cathode of said grid glow tube, means connecting the grid of said grid glow tube to the intermediate point of said two resistances, a time constant circuit connected in the anode circuit of said half-wave rectifier at the cathode of said glow tube and an oscillation quench circuit connecting the anode of said grid glow tube to the cathode of said oscillator.

LAMONT V. BLAKE.

REFERENCES CITED

The following references are of record in the file of this patent:

UNITED STATES PATENTS

| Number | Name | Date |
|---|---|---|
| 2,037,799 | Koch | Apr. 21, 1936 |
| 2,100,700 | Schlesinger | Nov. 30, 1937 |
| 2,103,362 | Hansell | Dec. 28, 1937 |
| 2,181,568 | Kotowski | Nov. 28, 1939 |
| 2,225,046 | Hunter | Dec. 17, 1940 |
| 2,226,459 | Bingley | Dec. 24, 1940 |
| 2,237,661 | Ernst | Apr. 8, 1941 |
| 2,295,835 | Hepp | Aug. 11, 1942 |
| 2,432,227 | Dailey et al. | Dec. 9, 1947 |

FOREIGN PATENTS

| Number | Country | Date |
|---|---|---|
| 108,640 | Australia | Oct. 5, 1939 |